United States Patent [19]
Feldstein

[11] Patent Number: 5,646,504
[45] Date of Patent: Jul. 8, 1997

[54] MAGNETICALLY BALANCED MULTI-OUTPUT BATTERY CHARGING SYSTEM

[76] Inventor: Robert S. Feldstein, 4 Clinton Ave., Dobbs Ferry, N.Y. 10522

[21] Appl. No.: 228,341

[22] Filed: Apr. 15, 1994

[51] Int. Cl.$^6$ .......................... H01M 10/44; H01M 10/46
[52] U.S. Cl. ............................ 320/17; 320/22; 320/51
[58] Field of Search .......................... 320/6, 7, 16, 17, 320/22, 51, 57, 61, 65, 68; 307/46, 49, 50

[56] References Cited

U.S. PATENT DOCUMENTS

| | | | |
|---|---|---|---|
| 4,079,303 | 3/1978 | Cox | 320/17 |
| 4,331,911 | 5/1982 | Park | 320/17 X |
| 4,645,995 | 2/1987 | Terrell et al. | 320/2 |
| 4,885,521 | 12/1989 | Crampton | 320/14 |
| 5,003,244 | 3/1991 | Davis, Jr. | 320/17 |
| 5,162,663 | 11/1992 | Combs et al. | 307/46 X |

FOREIGN PATENT DOCUMENTS 56-19119  2/1981  Japan .................. 363/67

*Primary Examiner*—Edward Tso
*Attorney, Agent, or Firm*—Howard M. Cohn

[57] ABSTRACT

Apparatus and methods for quickly and safely recharging and magnetically balancing a series of batteries or battery groups to their full charge capacity. The battery charging system includes a multi-output transformer having an impedance in the primary, a secondary with multiple outputs, and circuitry for charging each of the batteries or battery groups whereby the portion of charging current flowing from each of the multiple outputs to each of the batteries or battery groups relates inversely to the voltage of each of the batteries or battery groups.

24 Claims, 3 Drawing Sheets

MAGNETICALLY BALANCED MULTI-OUTPUT BATTERY CHARGING SYSTEM

CROSS-REFERENCE TO RELATED APPLICATIONS

This application is related to U.S. application Ser. No. 08/228,874, filed Apr. 18, 1994, by Robert Feldstein for COMPOUND BATTERY CHARGE SYSTEM AND U.S. application Ser. No. 08/228,393, filed Apr. 15, 1994, now U.S. Pat. No. 5,523,668, by Robert Feldstein for NICD/NIMH BATTERY CHARGER.

FIELD OF THE INVENTION

This invention relates to the field of battery charging and more particularly, to an apparatus and method for quickly and safely recharging and magnetically balancing a series of batteries to their full charge capacity with a relatively low cost, rugged, efficient battery charging system.

BACKGROUND OF THE INVENTION

Despite the decades of experience with the design of chargers for lead acid batteries, a number of practical limitations on system performance have not been effectively or economically addressed. These limitations relate to specific parameters associated with cells, batteries, and/or battery assemblies (a group of serially connected batteries). The following discussion focuses on these specific parameters and how they effect the cells, batteries, and battery assemblies.

The problems with cells and batteries are essentially the same since a battery is a group of combined cells and are referred to as cells and/or batteries herein. These problems concern charging rate limits (the speed with which a cell can be charged without causing damage to the cell structure), float life limits (the length of time a cell or battery can be maintained on charge while inactive) and cyclic effects (the number of times a cell can be discharged and recharged to a suitable capacity). Battery system problems include the effects of differential capacity (different cells and/or batteries in a series assembly having different capacity) and differential evolution (individual cells and/or batteries in a series assembly aging at different rates) in cells and batteries which are members of a series "string".

With problems relating to both cell and battery systems, a major difference in emphasis results from the application in which they are employed. For example, standby power systems (such as telecommunications back up power systems) differ significantly from cyclic power systems (such as power systems for traction devices which undergo a deep cycle (routinely discharged to a low level) or load leveling (frequently discharged to a moderate depth of discharge). The construction of cells differs in many ways, depending on the type of service for which the cell is intended.

The following discussion begins with the problems relating to cells, progresses to batteries, and then to battery systems. The examples are provided to illustrate preferred methods of achieving improved performance at acceptable cost. Obviously, the cost/performance trade-offs will vary with the application and the risk associated with unsatisfactory battery performance.

An individual lead acid cell may be flat plate, rolled plate, thin or thick, jar or tank formed, starved gelled or flooded, sealed or unsealed and may have a variety of alloying agents, electrolyte additives and construction variants, i.e., separators, expanders, float energy or power density, cyclic or float life, deep or shallow service, economy or durability and so on.

The basic system still requires the passage of a net charging current in the reverse direction from discharge to recharge the cell. This requires both an excess voltage (over the equilibrium open circuit voltage) to achieve significant cell current, especially at high state-of-charge, and excess charge (current times time) to compensate for the less than 100% charge acceptance efficiency of the cell. Many parameters of cell construction, including plate alloying additives, active material porosity, electrolytic composition, specific gravity, volume and mobility, affect overvoltage requirements, voltage, charge efficiency, and the effect of charge rate (at a given state-of-charge) on cell life and recoverable capacity.

Generally, the ability of a cell to absorb charging current efficiently, without requiring a large voltage excess and with high charge storage efficiency, declines as the state-of-charge increases. A "C" rating is defined as the current rating in amps that will discharge a battery in one hour). A 1C charge rate into a battery that is at 10% of its full state-of-charge is harmless for virtually any cell construction. However, the same charge rate into a battery having a 90% state-of-charge necessitates substantial overvoltage and results in reduced charge storage efficiency, generation of significant cell heating, possibly local gassing and, in many cell structures, significant non-uniformities over the plate surfaces. These non-uniformities can cause substantial local morphological variations especially in the positive plate oxide. In addition, stratification effects can occur in tall vertical plates (above about 10 inches in height).

One means of partially overcoming certain of the previous mentioned deficiencies resulting from charging batteries having a high state-of-charge is the use of reverse (discharge) current pulses interspersed in the charging current. Reverse current pulses are categorized as long, short and very short in duration. They tend to enhance charge acceptance, especially at high states-of-charge, by lowering the "barrier" height (the amount of excess voltage needed for charge acceptance) and increasing the net recharge energy by reducing cell heating from moderate rate, late stage, charging conditions. The reverse current pulses have been used as an aid in "quick charging" lead acid batteries for decades, usually described as boundary layer depolarization. However, the use of reverse current pulses, both long and short, fall short of overcoming the limitations in battery charging discussed before.

The use of very short (in duration) reverse current pulses in the range of milliseconds has a modest effect on lowering barrier height and relatively little effect on charge acceptance. This is because the improvement in charge acceptance during current flow in the "forward" or charging direction must exceed the "reverse" or discharge "loss" of the "backward" pulse.

For short pulses in the range of seconds (but still very short compared to the cell step function equilibrium time, which itself depends on the state-of-charge and cell construction), little internal reactant redistribution is created, especially when the reverse pulse currents are comparable in magnitude to the charging current. However, small scale anomalies in conductivity, concentration, etc., tend to spontaneously disappear over a period of time under these conditions. For example, a small conductivity plate region which selectively concentrates charging current and thereby enhances local oxide evolution, would be likely to provide an enhanced current density during discharge as well as atypical efficiency in the reverse direction.

Obviously, the net charge and discharge can't balance if the battery is to be recharged, and short reverse current pulses will cancel a portion of the charging current. The macroscopic cancellation does not operate symmetrically at small dimensions, as evidenced by the net increase in charging voltage, despite the current "loss" from the reverse pulses. The net effect of short, moderate current, reverse pulses is generally believed to improve plate uniformity (spatially) and retard oxide morphology evolution in both cyclic and standby systems. There is, however, evidence which indicates that the use of short pulse alone, without any other reverse pulse patterns, can give rise to a plate surface morphology which differs from any stage in the normal "aging" cycle, enhances the formation of dendrites on the cell surfaces, and reduces the charging capacity of the cell.

Long (in duration) reverse current pulses between about 1 second to about 15 seconds, can also be incorporated in the charging system, as generally described before. The reverse pulses are long in duration compared to the initial step function response time of virtually all lead acid cells under most state-of-charge conditions. The long reverse pulses at moderate current, generally below 1C and typically below C/10, causes re-equilibrium within the cell (which could be provided by a prolonged zero current "rest" state at significantly higher efficiency) and reverses reactive gradients within the electrolyte. The efficient dissolution of dendrites plus the reversal of anomalies over physically large ranges, (many inches) helps maintain cell uniformity, and tends to reduce cell aging from a "worst case" rate to a "typical" rate. In addition, the use of long reverse pulses on long standby basis appears to reverse some cell inhomogeneities, such as sulfation "patches" caused by prolonged storage. Still another possible advantage of these long reverse pulses is the partial restoration of compromised cell capacity. As a practical matter, long reverse pulses must be used sparingly, both to conserve charge time and to limit the "make-up" demands on the charger. Interpulse periods in the order of minutes are generally appropriate.

While it is possible to store and use the energy withdrawn from a cell (or battery) by either short or long reverse pulses, the cost of energy reclamation is usually not justified by the monetary value of the reclaimed energy and the reduced reliability of the charger resulting from its increased complexity. Since the heat generated by this dissipation of energy is primarily external to the cell, it does not cause cell degradation.

"Rest" periods with no current flow can also improve battery characteristics. In cyclic battery service, there is generally little opportunity to introduce long rest periods since they require more rapid charging due to the typically limited time in which they are recharged. Even in standby battery applications, where long rest periods (in the range of minutes to hours) efficiently and economically reduce the diffusion gradient normal to plate surfaces, they do not reduce gradients parallel to plate surfaces. Therefore, stratification effects are generally not mitigated by zero current rest intervals. Also, even when using rest periods, it may be desirable to cause mechanical mixing by including very high current reverse pulses to induce local temperature anomalies and thermal diffusion or even brief very high current charging pulses to introduce gas bubbles throughout the system, especially in cells larger than about 100 Ampere-Hours (AH) per plate.

The range of effects which can be manipulated by the duration, current, and repetition rate of one or more reverse current pulse patterns, both short and long, are numerous. The previous examples illustrate a relatively simple way in which some of the choices can be economically implemented. Furthermore, serious loss of capacity mechanisms which become more noticeable toward the end of battery service life, such as plate sulfation, are effectively reduced by a multiple, reverse pulse environment. This can be an economical advantage since it delays battery replacement.

In expanding this discussion from cells to batteries (a small group of series connected cells—typically 3 or 6 cells in a lead acid type battery), effects resulting from cell differences, both initially and during operation, become significant. Cells can initially differ in both their capacity and their recharge efficiency. Additional cell differences arise due to differential aging of cells used in both cyclic and float service applications.

Continuous charging rates depend on small recombinant capacity of lead acid systems (especially sealed, starved electrolyte systems) which generally have a limit of about C/200. Therefore, a small continuous "trickle" current can effectively "complete" the charging of larger capacity cells in a series group. This is necessary because the "smallest" cells reach full charge first and raise the series string voltage to the charger cut-off limit before the larger capacity cells reach full charge. The trickle current, on the other hand, allows each cell to eventually reach full charge. Of course the trickle current must be larger than the self discharge current, which is typically about C/5000 to C/1000 depending on the cell construction and its operating temperature.

The difference between trickle current and self discharge current must be dealt with by recombination (or made up in refillable cells). By improving cell surface uniformity and reducing gradients, the self discharge currents and the required trickle current tend to be minimized, and the resultant recombinant capacity, i.e. the ability of the cell to receive current for ever, is minimized. Recombinant behavior is never perfect and leads to gas loss and consequent "drying".

Battery systems often contain long series of connected groups of batteries. All of the aforementioned problems with cells and single batteries are compounded in battery systems, especially since the differences between batteries tend to initially be larger and to grow more rapidly than the differences between cells in the same battery.

Long strings and/or systems with large cyclic requirements and "deep cycle" demands (discharging daily to as high as 85% of full charge in traction battery applications) may lead to catastrophic consequences as the initial battery differences grow with use. For example, a nominal 120 volt standby power system consisting of ten 12 V batteries, each with 6 cells in series, is subjected to discharge to 1.6 V per cell, i.e., a total discharge of 96 volts. The smallest cells (of the 60 in series) will be discharged well below 1.6 V and may even reach zero or be reversed before load cut-off occurs. This will reduce cell capacity slightly, but permanently because cells tend to be altered by deep discharge. Therefore, on recharge, the smallest cells will be somewhat overcharged before the total series assembly reaches high charge cut-off (at typically 2.30 V/cell) at 138 V. Some water loss will inevitably occur raising the specific gravity of the electrolyte and increasing local current activity and corrosion. With each cycle, the smallest cell will "shrink" more than the largest cells and the trickle current will become a larger fraction of the actual cell capacity and, therefore, closer to the recombinant limit. Eventually, the trickle current will approach the recombinant limit and rapid deterioration will follow because the extra charge current which is not recombined will cause effects such as corrosion, gas release, and decomposition of reactants.

This situation cannot be effectively improved, especially in cyclic service, by reducing the overall charging voltage since this will place the largest cells in an undercharged condition at the end of high charge. The trickle charge, which is only on for a limited period of time between battery usage, can generally not make up for a large deficiency in the charge capacity quickly enough to avoid undesirable changes in both plates. The introduction of periodic "equalization" charges, i.e., controlled overcharge, tends to aggravate the situation for the "smaller" cells while improving the condition of the larger cells.

The traditional "high performance" solution has been "group charging" where the series assembly is divided into subgroups, each provided with a separate charger. This may be as simple as one charger per 24 or 48 volt subgroup or as sophisticated as one charger per cell. While the results can be excellent, the cost is prohibitive for most applications, and the added complexity of the multiple systems can reduce reliability unless stringent quality control is imposed, further increasing cost.

In a traction battery system, a somewhat different form of the problem discussed with the standby system occurs. In this application, battery groups of typically 36 or 48 volts are 85% discharged in 16 hours and must be recharged in 8 hours daily. Discharge becomes damaging as the gradual reduction of cell capacity leads to discharge approaching 100% for the smallest cells. Rapid recharge requires sufficient current to assure full recharge of the largest cell within the allowed time. Therefore, the bulk of the cells (and possibly all of them late in life) are overcharged daily. This results in significant water loss which must be made up and generally precludes the use of sealed cells for this application. Flooded cells requiring continuous maintenance are the rule in this application, which has tolerated crude, brute force, chargers (which are economical and rugged but heavy, inefficient, and inaccurate) to flourish. Here again, while a charger per battery or cell would greatly improve performance, it would be at a cost and level of complexity, inappropriate to the field.

A serious need exists to provide a charging system which addresses the majority of the issues in lead acid charging without affecting the battery construction. Its design must provide the flexibility to economically apply those functions required for each specific application.

OBJECTS AND SUMMARY OF THE INVENTION

It is an object of the present invention to provide an improved magnetically balanced, multi-output battery charging system and method of operating the system which obviates the problems and limitations of the prior art systems.

It is a further object of the present invention to provide an improved magnetically balanced multi-output battery charging system and method of operating the system which includes a primary system battery charger and a plurality of segmented battery chargers for each battery.

Yet another object is to provide an improved magnetically balanced multi-output battery charging system and method of operating the system at which is not significantly different in cost from a single battery charger for the entire system.

In accordance with the invention, there is provided a magnetically balanced, multi-output battery charging system for charging a string of serially connected batteries through connection to the interbattery junctions. The system includes a multi-output transformer having an impedance in the primary and a secondary with multiple outputs. The impedance can be a capacitor, and inductor, or a resistor. Each of the multiple outputs is connected to a battery or group of batteries. The circuit provides charging current to each of the batteries or battery groups whereby the portion of charging current flowing from each of the multiple outputs to each of the batteries or battery groups relates inversely to the voltage of each of the batteries or battery groups.

Further in accordance with the invention, the system includes a control section for charging all of the batteries to full charge capacity. The control section controls the current flow through the primary in response to the overall voltage across an entire string of batteries. The control section turns the current flow through the primary amount on and off to provide the full charging current in response to the overall voltage across the string of batteries. The current through the primary results in three types of charging current. First, a walk-in charging current, having an average value of between about C/200 and C/1000, is provided to each of the batteries whenever the overall voltage across the string of batteries is at a first value typically below about 70% of the batteries full charge voltage. Second, a trickle current, having an average value of between about C/200 and C/5000, is provided to each of the batteries whenever the overall voltage across the string of batteries is at a second value corresponding to above 100% of the batteries full charge voltage. Thirdly, a full charging current, having a typical average value between about C/50 and 3C, is provided to each of the batteries whenever the overall voltage across the string of batteries is at a third value corresponding to above the first value and below the second value of the batteries full charge voltage.

In accordance with the invention, a method of charging a string of batteries serially connected at junctions to each other includes the following steps. A multi-output transformer having an impedance in the primary and a secondary with multiple outputs is provided. Each of the multiple outputs is rectified and connected to one of batteries or battery groups belonging to the "string". Each of the batteries is charged to substantial capacity so that a portion of charging current flowing from each of the multiple outputs to each of the batteries relates inversely to the voltage of each of the batteries.

Further in accordance with the invention, the current flow through the primary is controlled in response to the overall voltage across the string of batteries. Firstly, the current through the primary is controlled to provide a walk-in charging current of the string of batteries whenever the overall voltage across the string of batteries is at a first value typically below about 70% of the batteries full charge voltage. Secondly, the current through the primary is controlled to provide a trickle current whenever the overall voltage across the string of batteries is at a second value corresponding to above about 100% of the batteries full charge voltage. Thirdly, the current through the primary is controlled to provide a full charging current to the string of batteries whenever the overall voltage across the string of batteries is at a third value corresponding to above the first value and below the second value of the batteries full charge voltage.

BRIEF DESCRIPTION OF THE DRAWINGS

The structure, operation, and advantages of the presently preferred embodiment of the invention will become further apparent upon consideration of the following description taken in conjunction with the accompanying drawings.

DETAILED DESCRIPTION OF THE INVENTION

Figure 1:
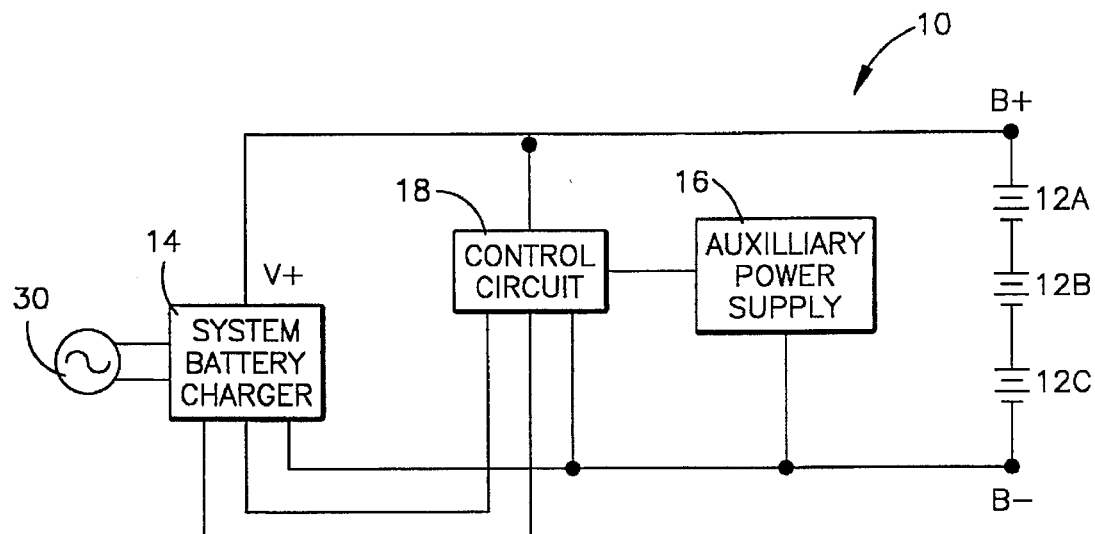
FIG. 1 is a simplified illustration of a magnetically balanced charging system adapted for charging a single battery or string of batteries in accordance with the invention.
Figure 3:
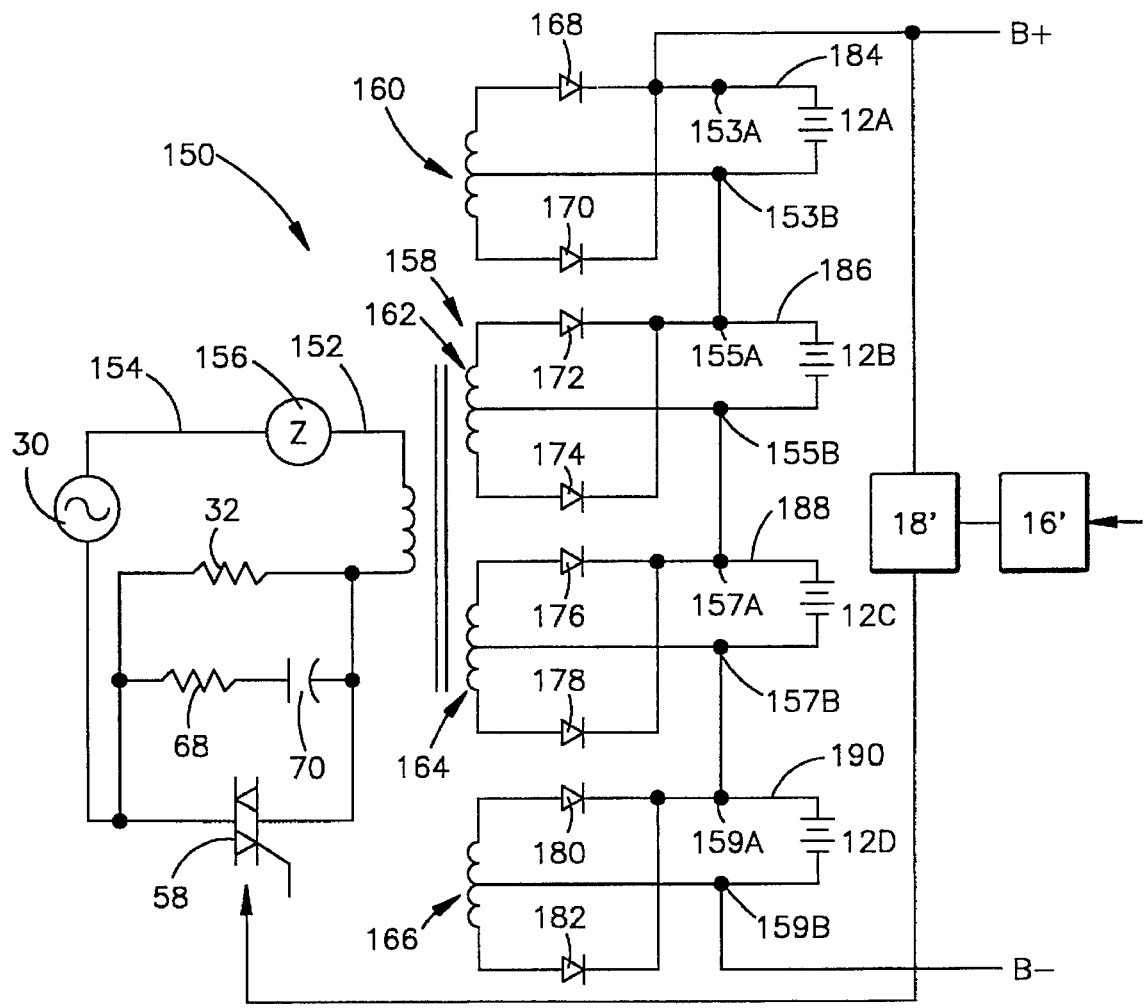
FIG. 3 is a schematic illustration of a magnetically balanced charging system incorporating a single system power supply for charging the overall battery string and multiple rectified secondaries connected to a string of batteries for charging that group in accordance with the invention.

FIG. 1 shows a schematic illustration of a battery charging system 10 for charging a string of batteries 12A, 12B, and 12C (12A–12C) connected in series. Battery charging system 10 incorporates a magnetically balanced charging system 150, as illustrated in FIG. 3, and discussed in detail below. An example of an appropriate control design for battery charging system 10, as shown in detail in FIG. 2 includes a system battery charger 14 for charging batteries 12A–12C, an auxiliary power supply 16, and a system control section 18. System control section 18 has three primary functions: a) to initiate a walk-in recharging current into batteries 12A–12C from system battery charger 14 whenever batteries 12A–12C have less than about 70% of their full charge voltage; b) to deliver a full recharging current from battery charger 14 to batteries 12A–12C whenever batteries 12A–12C have between about 70% and 100% of their full charge voltage; and c) to deliver a trickle recharge current from system battery charger 14 to batteries 12A–12C whenever batteries 12A–12C have more than 100% of their full charge voltage.

Control circuit 18 responds to the voltage of the series of batteries 12A–12C by outputting a switching signal for turning system battery charger 14 on whenever the charge level in batteries 12A–12C is between about 70% and 100% of their full charge capacity, as discussed in detail below. Control circuit 18 also responds to the voltage of the series of batteries 12A–12C by turning off system battery charger 14 whenever the battery charge in batteries 12A–12C is either greater than 100% of their full charge voltage or less than about 70% of their full charge voltage.

Another feature of the invention is a trickle charge and "walk-in" section 32 in parallel with battery charger control switch 28 within system battery charger 14. Section 32 enables battery charger 14 to deliver a small trickle charge whenever the control switch 28 is open and A.C. main power is available. The trickle charge is between about C/200 and C/5000 and preferably about C/500 and C/1000. The walk-in charge, below the minimum turn on voltage for 28, is between about C/200 and C/5000 and preferably between C/400 and C/8000.

Figure 2:
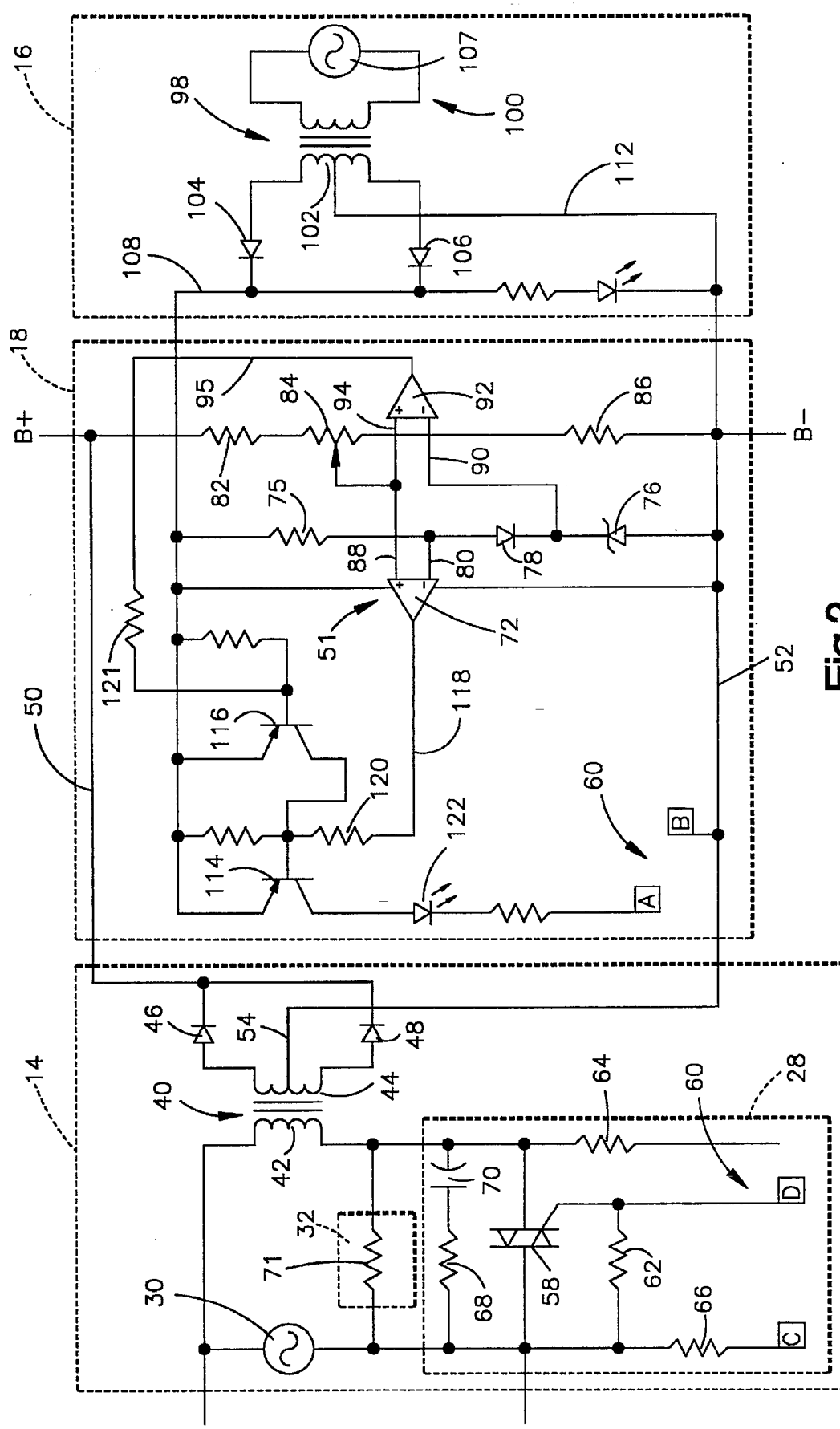
FIG. 2 is a circuit diagram of a control circuit for a magnetically balanced charging system shown in FIG. 1.

FIG. 2 is a schematic diagram of one preferred embodiment of a control for battery charger 10 of the present invention. The embodiment of FIG. 1 is suitable for charging a series of batteries 12A–12C. The alternating current is preferably provided to a system battery charger 14 from a source of A-C power 30. The system battery charger 14 includes a main transformer 40 having a primary 42 a split secondary 44 and diodes 46 and 48. In one embodiment, the alternating current from source 30 is standard 120 volt/60 hertz main power. In another embodiment, the alternating current is conventional 220 volt/50 hertz main power. Other alternating current sources can also be used.

The alternating current provided to diodes 46 and 48 is rectified. The direct current produced is connected to common bus 50. The main negative bus 52 is taken from the center tap 54 of the secondary of transformer 40. Diodes 46 and 48 provide a rectified positive voltage to bus 50. The positive voltage on bus 50 can be used to charge batteries 12A–12C having an overall battery voltage of $B^+$-$B^-$.

One end of primary 42 can be connected to source 30 and the other end of primary 42 can be connected to source 30 via a charger control switch 28 paralleled by 32 within system battery charger section 14. The charger control switch 28 includes a triac 58 which controls current flow through primary 42 in response to an opto-coupler 60 such as a Motorola MOC3032 zero crossing opto-coupler triac driver under the control of control circuit 18, described hereinafter. Triac 58 is controlled through standard network resistor 62, 64, and 66 as is conventionally known to one skilled in the art. Resistor 68 and capacitor 70 provide a "snubber".

Trickle charge section 32 incorporates a resistor 71 to provide trickle and walk-in current to the batteries 12A–12C when the batteries have a charge of either less than 70% or more than 100% of their full charge voltage, as discussed in more detail below.

Control circuit 18 has a means 51 for comparing the battery voltage $B^+$-$B^-$ across batteries 12A–12C with a first reference voltage provided by a current from bus 108 which passes through resistor 75, Zener diode 76, and diode 78 to a reference input 80 of a comparator 72. The battery voltage is supplied by a current which passes through resistors 82, 84, and 86 into input 88. The first reference voltage is typically set to be desired float voltage of the batteries.

Control circuit 18 has a second means for comparing the battery voltage $B^+$-$B^-$ across batteries 12A–12C with a second reference voltage provided by a current from bus 108 which passes through a Zener diode 76 to a reference input 90 of a second comparator 92. The battery voltage is supplied by a current which passes through resistors 82, 84 and 86 into input 94. The second reference voltage is typically set to be about 70% of the full charge voltage of the batteries.

Control circuit 18 also includes a secondary power supply 16 constructed of a transformer 98 having a primary 100, a split secondary 102 and diodes 104 and 106. In one embodiment, the alternating current from a source 107 is standard 120 volt/60 hertz main power. In another embodiment, the alternating current is conventional 220 volt/50 hertz main power. Other alternating current sources can also be used. The secondary power supply 16 is always operating to provide alternating current which is rectified by diodes 104 and 106. The direct current produced is connected to common bus 108. The main negative bus 110 is connected to the center tap 112 of the secondary of transformer 98. The positive voltage on bus 108 is used to power control circuit 18. This is a significant aspect of the embodiment since auxiliary power supply 16 can operate on a lower voltage than power supply 14 which charges the batteries. The battery charger of the present invention which incorporates the combination of a large and small power supply is very often more economical than a battery charger with a only a large power supply.

Control circuit 18 has transistors 114 and 116 to control current to opto-coupler 60. Transistor 114 functions to direct a current into opto-coupler 60 to send a signal to control circuit 28 to operate charger 14 at a high level to recharge the system batteries whenever the batteries 12A–12C have a voltage of between about 70% and about 100% of full charge battery voltage. Transistor 116 functions to prevent opto-coupler 60 from sending a signal to control circuit 28 whenever the batteries have a voltage of less than about 70% of full charge battery voltage. Charger 14 is shut off except for charging with walk-in current in the first case due to the operation of 92 and 116 and trickle current in the case of a battery voltage above 100% of full charge float voltage due to the operation of comparator 72 and transistor 114.

Whenever the first reference voltage (corresponding to 100% of full charge battery voltage) at input 80 of comparator 72 is lower than the battery voltage at input 88, the voltage at output 118 snaps up so that transistor 114 does not allow current to flow through L.E.D. 122 to activate opto-coupler 60. As discussed below, opto-coupler 60 sends a signal to triac 58 so that battery charger 14 turns on and charges batteries 12A–12C whenever the battery voltage is below full charge voltage and above the voltage at which 92 and 116 inhibit transistor 114. Conversely, whenever the first reference voltage at input 80 exceeds the battery voltage at input 88, the voltage at output 118 snaps down so that transistor 114 provides current flows through L.E.D. 122 and opto-coupler 60 so that switching section 28 causes battery charger 40 to charge batteries 12A–12C.

Whenever the second reference voltage 90 (typically corresponding to about 70% of full charge battery voltage) of comparator 92 exceeds the battery voltage at input 94, the voltage at output 95 snaps down so that transistor 116 turns on and pulls the base of transistor 114 up. The result is that current cannot flow through L.E.D. 122 and opto-coupler 60 so that switching section 28 does not allow battery charger 14 to charging batteries 12A–12C except with a walk-in charge. Note that during this period, output 118 of comparator 72 is low as previously discussed. However, resistor 121 insures that transistor 116 turns on and pulls up the base of transistor 114 to prevent current flow to opto-coupler 60.

In operation, whenever the string of batteries 12A–12C are below about 70% of their full charge voltage, comparator 92 prevents an output signal from control section 18 from activating triac 58 in control switch 28 which, in turn, prevents battery charger 14 from delivering large charging currents to the string of batteries 12A–12C. However, during this period, the section 32 causes the battery charger 14 to deliver a walk-in charge to the batteries 12A–12C so as to slowly bring them up to about 70% of their full charge voltage. This is necessary because the batteries may not accept the full charge when they are too depleted and the charger should be protected against overload. Whenever the string of batteries 12A–12C reach a charge level of above about 70% of their full charge voltage, comparator 92 permits comparator 72 to direct an output signal from control section 18 which activates triac 58 in switch 28 causing battery charger 14 to deliver full charging current to the string of batteries 12A–12C. Finally, when batteries 12A–12C rise to 100% of their full charge voltage, comparator 72 no longer presents an output signal from control section 18 to control switch 28 and therefore, the battery charger 14 does not deliver large charging current to the string of batteries 12A–12C. During this period, the trickle charge control 32 causes battery charger 14 to deliver a trickle charge to the batteries 12A–12C to slowly bring each up to full charge without causing any damage to the batteries.

The preferred embodiment of the invention, as shown in a schematic circuit illustrated in FIG. 3, includes a magnetically balanced, charging system 150 with a battery charger 152 for charging a string of batteries serially connected at junctions 153A, 153B, 155A, 155B, 157A, 157B, 159A, 159B (153A–159B) to each other. Battery charger 152 has a primary section 154 which is substantially identical to that illustrated in FIG. 2 with the exception of an additional impedance 156, as discussed in more detail below. The system 150 includes a multi-output transformer having an impedance in series with the primary 154 and multiple secondary windings. The impedance can be a capacitor, an inductor, or a resistor. Each of the multiple outputs is connected to one of the junctions 153A–159B. Means are provided for charging each of the batteries whereby the portion of charging current flowing from each of the multiple outputs to each of the batteries relates inversely to the voltage of each battery. A secondary section 158 which is separated into a plurality of identical secondary sections 160, 162, 164 and 166 each has two diodes 168 and 170, 172, 174, 176, 178, 180, 182, respectively, to provide a rectified positive voltage 184, 186, 188, and 190 for charging a plurality of serially connected batteries or groups of batteries 12A–12D. While the overall battery string of FIG. 3 is shown as being composed of 4 batteries 12A–12D, it is also within the terms of the invention to use any number of individual batteries or battery subgroups connected between each of junctions 153A–159B.

A control circuit 18' and auxiliary supply 16' are provided in the circuit across the overall battery string 12A–12D having an overall voltage $B^+$-$B^-$ to operate in accordance with the description relating to the circuit illustrated in FIG. 2. Throughout the specification, primed reference numerals represent structural elements which are substantially identical to structural elements represented by the same unprimed reference numerals.

A description of the operation of the system 150 follows. First, consider an idealized system in which all secondaries are identical and have zero resistance, and all diodes have a negligible forward voltage drop. Since all secondaries share the reflected common primary impedance 15C, the charging current would then be selectively delivered to the battery or group of batteries 12A–12D having the lowest voltage in the string. The charging current would accumulate in this low voltage battery until it reached the voltage of the battery having the next lowest voltage. At that time, the two batteries would share the available charging current. This process would continue until each battery in the entire string is charged to the same voltage at the overall cut-off. The overall cut-off occurs when the control circuit turns off the primary 154 and allows only trickle current into the battery string, i.e. when the overall voltage $B^+$-$B^-$ of the string is at a value greater than the full charge battery voltage across the string. An important advantage of the invention is that the batteries would reach cut-off with similar voltages despite differences in capacity, initial state-of-charge, differential aging of batteries, and other parameters.

Conversely, when the overall voltage across the string of batteries 12A–12D reaches a value corresponding to less than between about 70% of the full charge battery voltage (across the string), the control circuit 18' turns off the primary 154 and allows only walk-in current into the battery string.

In practice system 150 does not operate in this idealized manner since the resistance of any multi-output secondary 160–166 which selectively delivers current to the battery or batteries 12A–12D having the lowest voltage in the string reduces the output of that secondary but not of the other secondaries. This effect can be substantial in an economically, sensible transformer. Therefore, the actual effect for batteries which are not dramatically different in voltage is that charging current is distributed to most or all of the batteries. Note, however, that the charging current to each battery is inversely proportional to the battery voltage and therefore its state-of-charge.

The magnetically balanced charging system 150 of the present invention takes advantage of the charging current to each battery being inversely proportional to its voltage and will tend to balance the batteries 12A–12D during charging. Thus, system 150 represents an economically attractive intermediate between the overall charging of the entire series string, as a two terminal device, and the precise performance available from compound or segmented chargers, as disclosed in a related application set forth herein.

An added economic advantage of this magnetically balanced system over a compound system is achieved in applications where rapid charging time is required. That is, an oversized main charger is not needed to quickly reach a high state-of-charge so that the small individual chargers have time to bring the batteries to a full state of charge at their slower charge rate.

There is only a single system set point (with hysteresis if desired) and the charger will continue charging until charge acceptance at the final cut-off voltage restricts current input.

Another important aspect of the invention relates to the inclusion of a primary series impedance 156 in series with the primary winding of transformer 154, as shown in FIG. 3. The impedance 156 acts to lower the primary current and the overall charging current available to be delivered through the secondary windings. The quality of the inverse sharing of charging current between the batteries 12A–12D is a function of the common source impedance 156 as opposed to the individual section output impedance. When the reflected secondary impedance of impedance 156 is selected to be substantially higher than the impedance of the individual half secondary windings, then effective secondary charging current partitioning results. Impedance 156 is typically selected to be a value larger than the square of the turns ratio times ½ the secondary impedance. For example, if the turns ratio is N/10, the impedance would be larger than 100 times greater than the impedance of the individual secondaries. Typically, the impedance is provided by an inductor in a high current (larger) systems where the impedance required is fairly small and currents are large. Conversely, in a smaller system, where the impedance required is relatively large and currents are small, the impedance is typically provided by a capacitor. Attention should be paid in the system design to avoid resonance effects, especially at low currents.

Figure 4:
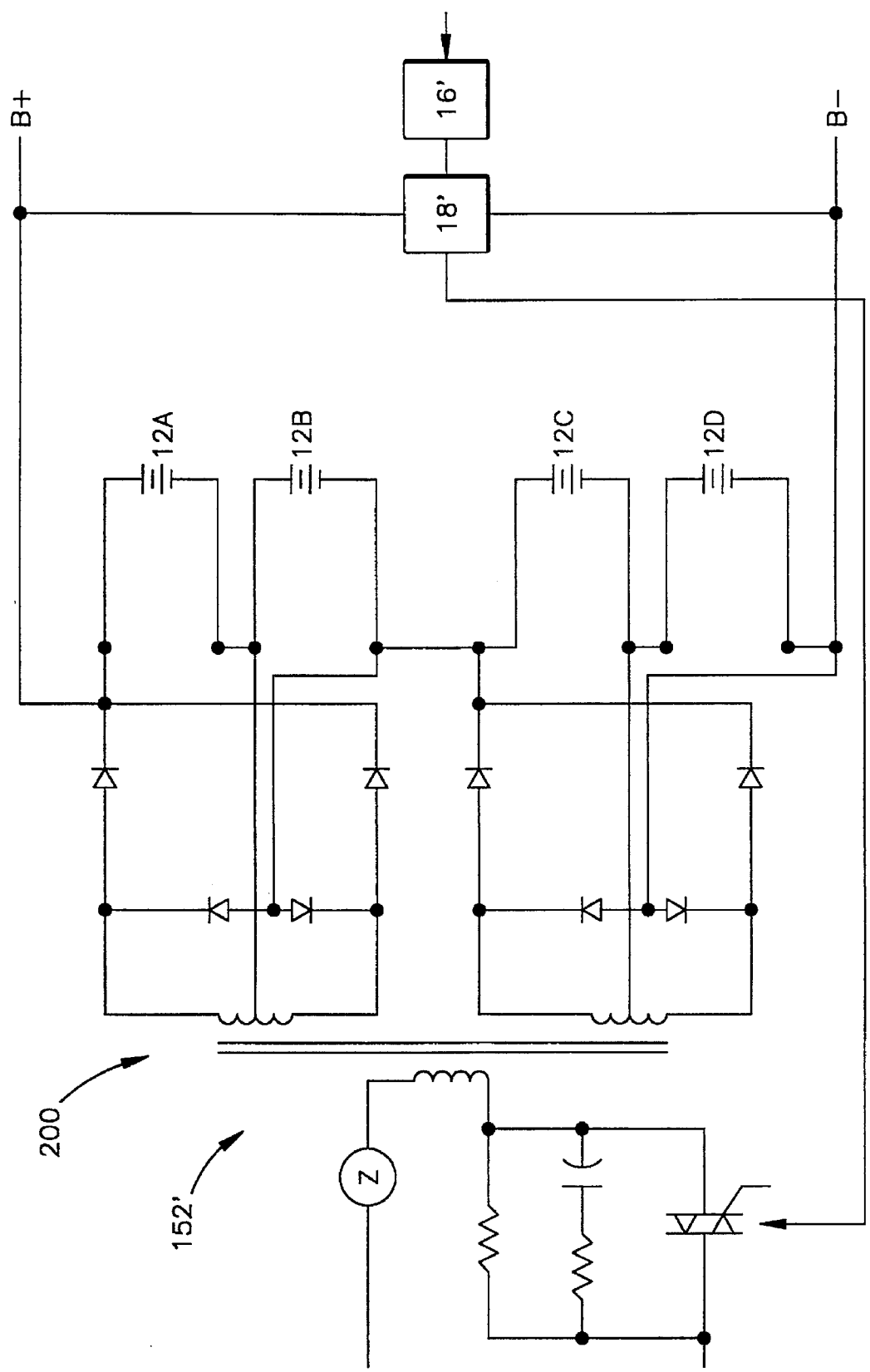
FIG. 4 is a schematic illustration of an alternative system power supply requiring a reduced number of secondary windings.

While the above described apparatus and method of the invention provides a very effective magnetically balanced, charging system 150 which includes a battery charger 152 having a primary section 154 and a secondary section 158, it is also within the terms of the invention to provide an alternative embodiment, as illustrated in FIG. 4, wherein each secondary section 202 of battery charger 200 is shared between two batteries 12A, 12B and 12C and 12D. This not only reduces the cost and complexity of battery charger 200 but also reduces the impedance of the individual secondaries by essentially doubling the available cross-section and halving the number.

While the specification is discussed in terms of lead acid batteries, it is also within the scope of the invention to use other battery systems, such as pocket plate, nickel cadmium or other rechargeable cell types.

It is apparent that there has been provided in accordance with this invention a magnetically balanced charging system and methods of using the system that satisfy the objects, means and advantages set forth hereinbefore. According to the invention, a relatively low cost, rugged, efficient, battery charging system is provided to quickly and safely recharge and magnetically balance a series of batteries to their full charge capacity.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

I claim:

1. A magnetically balanced, multi-output battery charging system for charging a string of batteries or battery groups serially connected at junctions to each other, comprising:
   a multi-output transformer having a primary and secondary with multiple secondary outputs, each of said multiple secondary outputs being connected to one of said string of batteries or battery groups;
   an impedance connected in series with said primary; and
   means for controlling both primary current flow through said primary and charging current flow through said secondary with multiple secondary outputs in response to the charge level of each of said string of batteries or battery groups whereby said charging current is a function of said impedance in said primary so that the portion of charging current flowing from each of said multiple secondary outputs to each of said string of batteries or battery groups relates inversely to the voltage across each of said string of batteries or battery groups.

2. The magnetically balanced, multi-output battery charging system of claim 1 wherein said impedance is a capacitor.

3. The magnetically balanced, multi-output battery charging system of claim 1 wherein said impedance is an inductor.

4. The magnetically balanced, multi-output battery charging system of claim 1 wherein said impedance is a resistor.

5. The magnetically balanced, multi-output battery charging system of claim 1 wherein said means for controlling charges each of said string of batteries or battery groups to full charge capacity.

6. The magnetically balanced, multi-output battery charging system of claim 5 wherein said means for controlling primary current flow through said primary is in response to the overall voltage across said string of batteries or battery groups.

7. The magnetically balanced, multi-output battery charging system of claim 6 wherein said means for controlling primary current flow through said primary causes a walk-in charging current to be delivered to said string of batteries or battery groups whenever said overall voltage across said string of batteries or battery groups is at a first value corresponding to below about 70% of said string of batteries or battery groups full charge voltage.

8. The magnetically balanced, multi-output battery charging system of claim 7 wherein said walk-in charging current is delivered whenever said overall voltage across said string of batteries or battery groups is at a first value corresponding to below about 70% of said batteries full charge voltage.

9. The magnetically balanced, multi-output battery charging system of claim 8 wherein said walk-in charging current has a value of between about C/200 and C/5000.

10. The magnetically balanced, multi-output battery charging system of claim 9 wherein said walk-in charging current has a value of between about C/400 and C/5000.

11. The magnetically balanced, multi-output battery charging system of claim 7 wherein said means for controlling current flow through said primary causes a trickle current to be delivered to said string of batteries or battery groups whenever said overall voltage across said string of batteries or battery groups is at a second value above 100% of said batteries or battery groups full charge voltage.

12. The magnetically balanced, multi-output battery charging system of claim 11 wherein said trickle charging current has a value of between about C/500 and C/1000.

13. The magnetically balanced, multi-output battery charging system of claim 11 wherein said means for controlling current flow through said primary causes a full charging current to be delivered to said string of batteries or battery groups whenever said overall voltage across said string of batteries or battery groups is at a third value corresponding to above said first value and below said second value of said string of batteries or battery groups full charge voltage.

14. The magnetically balanced, multi-output battery charging system of claim 13 wherein said full charging current has a value of between about C/50 and 3C.

15. The magnetically balanced, multi-output battery charging system of claim 1 wherein said means for charging each of said string of batteries or battery groups includes a control section for turning said current flow through said primary on and off to provide said full charging current in response to the overall voltage across said string of batteries or battery groups.

16. A method of charging a string of batteries or battery groups serially connected at junctions to each other, comprising the steps of:

connecting each of said multiple outputs of a multi-output transformer having a primary with an impedance connected in series and a secondary with multiple secondary outputs each connected to one of said string of batteries or battery groups; and controlling both primary current flow through said of primary and charging current flow through said multiple secondary outputs in response to the charge level of each of said string of batteries or battery groups whereby said charging current is a function of said impedance in said primary so that the portion of charging current flowing from each of said multiple secondary outputs to each of said string of batteries or battery groups relates inversely to the voltage of each of said string of batteries or battery groups.

17. The method of claim 16 further including the step of charging each of said string of batteries or battery groups to full charge capacity.

18. The method of claim 17 further including the step of controlling current flow through said primary in response to the overall voltage across said string of batteries or battery groups.

19. The method of claim 18 further including the step of controlling current through said primary to provide a walk-in charging current to said string of batteries or battery groups whenever said overall voltage across said string of batteries or battery groups is at a first value corresponding to below about 70% of said string of batteries or battery groups full charge voltage.

20. The method of claim 19 further including the step of selecting said walk-in charging current having a value of between about C/200 and C/5000.

21. The method of claim 19 further including the step of controlling current through said primary to provide a trickle charging current to said string of batteries or battery groups whenever said overall voltage across said string of batteries or battery groups is at a second value greater than 100% of said string of batteries or battery groups full charge capacity.

22. The method of claim 21 further including the step of selecting said trickle charging current having a value of between about C/500 and C/1000.

23. The method of claim 21 further including the step of controlling current through said primary to provide a full charging current to said string of batteries or battery groups whenever said overall voltage across said string of batteries or battery groups is at a third value corresponding to above said first value and below said second value of said string of batteries or battery groups full charge capacity.

24. The method of claim 23 further including the step of selecting said full charging current having a value of between about C/50 and 3C.

* * * * *